United States Patent

[11] 3,562,526

| [72] | Inventor | Bobby L. Lawson<br>Bartlesville, Okla. |
|---|---|---|
| [21] | Appl. No. | 675,915 |
| [22] | Filed | Oct. 17, 1967 |
| [45] | Patented | Feb. 9, 1971 |
| [73] | Assignee | Phillips Petroleum Company<br>a corporation of Delaware |

[54] NEUTRON-GAMMA RAY WELL LOGGING APPARATUS EMPLOYING SPACED GAMMA RAY DETECTORS
8 Claims, 3 Drawing Figs.

| [52] | U.S. Cl. | 250/71.5,<br>250/83.3, 250/83.6, 250/108 |
|---|---|---|
| [51] | Int. Cl. | G01t 1/20,<br>G01v 5/00 |
| [50] | Field of Search | 250/71.5,<br>83.6W, 108, 83.3 |

[56] References Cited
UNITED STATES PATENTS

| 2,911,534 | 11/1959 | Brannon, Jr. et al. | 250/71.5 |
| 2,992,331 | 7/1961 | Bonner et al. | 250/83.6W |
| 3,089,954 | 5/1963 | Johnson | 250/71.5 |
| 3,235,729 | 2/1966 | Scherbatskoy | 250/83.3 |

*Primary Examiner*—Ralph G. Nilson
*Assistant Examiner*—Morton J. Frome
*Attorney*—Young and Quigg ABSTRACT: A neutron-gamma ray well-logging device comprises a neutron source and two spaced gamma ray detectors. The detectors are shielded so that only gamma rays which emerge from the formations at a predetermined angle are allowed to strike the first detector. Only gamma rays which are emitted from the first detector at a predetermined angle are allowed to strike the second detector.

PATENTED FEB 9 1971
3,562,526
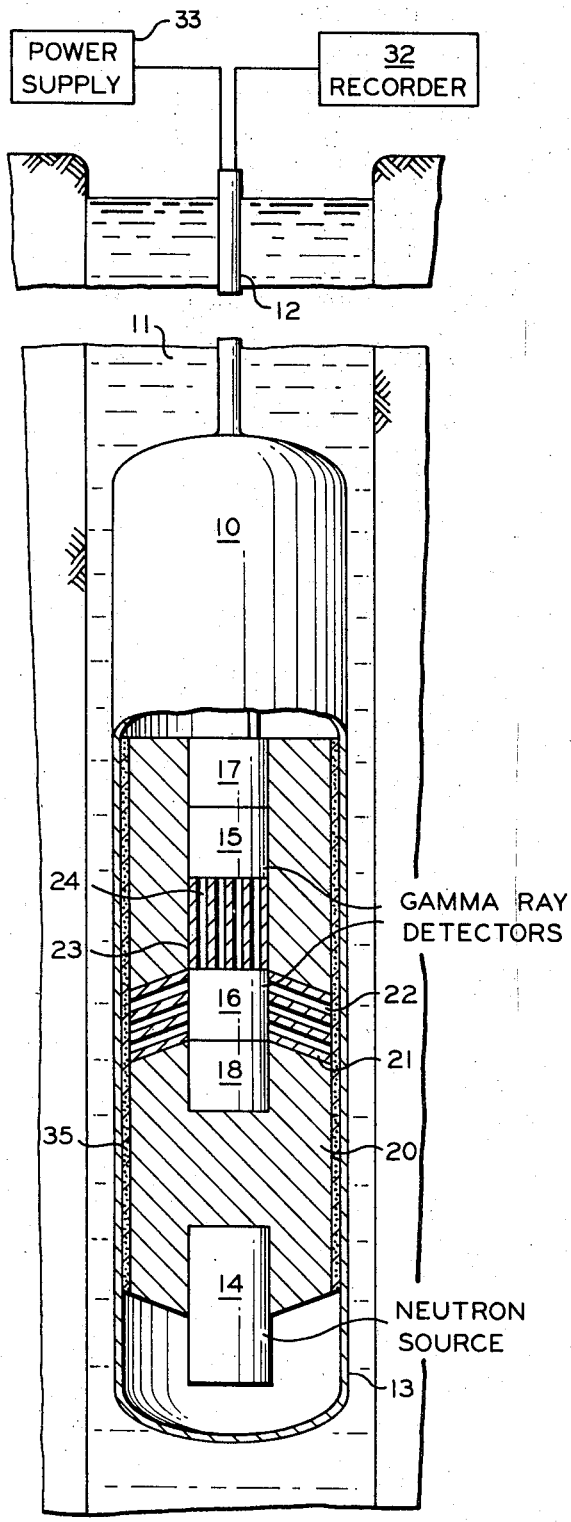
FIG. 1
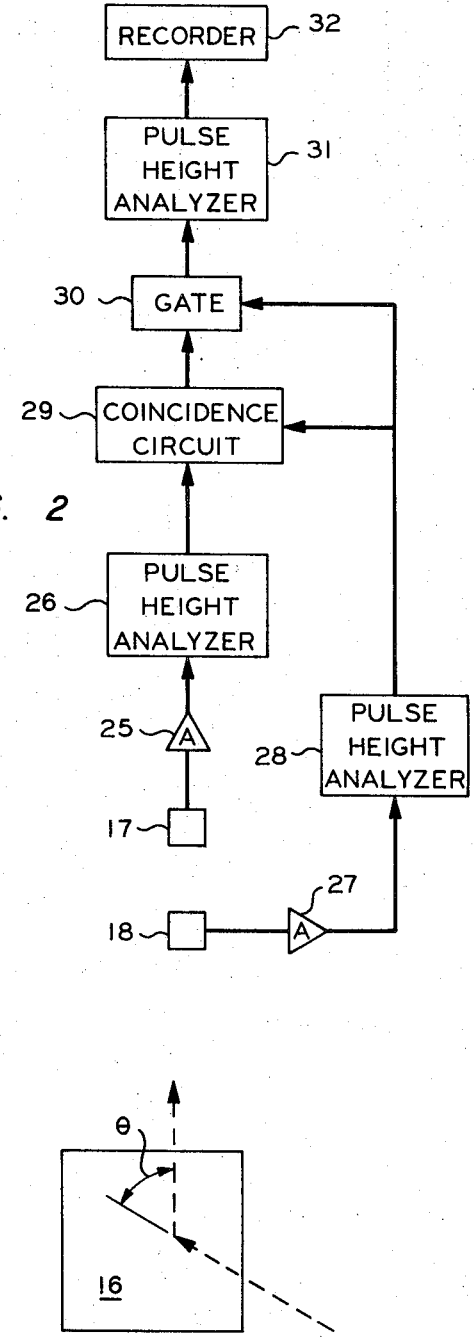
FIG. 2
FIG. 3
INVENTOR.
B. L. LAWSON
BY Young & Quigg
ATTORNEYS

NEUTRON-GAMMA RAY WELL LOGGING APPARATUS EMPLOYING SPACED GAMMA RAY DETECTORS

This invention relates to the identification of elements in earth formations by irradiating the formations with neutrons and measuring the resulting gamma rays.

Various types of logging devices have been proposed or developed for measuring properties of formations intersected by boreholes. In recent years these have included instruments which utilized nuclear radiation to identify the presence of specific elements. For example, it has been proposed to irradiate the formations with neutrons in order to generate gamma rays. Since various elements which are present in the formations irradiate gamma rays of characteristic energies when bombarded with neutrons, it is theoretically possible to identify the individual elements by measuring the energies of the gamma rays produced. Well-logging apparatus based on this principle is described in U.S. Pat. No. 3,089,954, for example.

However, the apparatus heretofore known in the art has not been entirely satisfactory because of difficulties encountered in attempting to identify specific elements in the presence of other elements which produce gamma rays of similar energies. It is also difficult to measure the actual energy levels of the gamma rays by means of known detectors. For example, the most useful type of gamma ray detector for well-logging is the scintillation detector, which measures the intensity of flashes of light which are produced when gamma rays strike a detector. However, three different reactions can take place. The first of these is the photoelectric effect, in which a high energy electron is produced when a gamma ray is absorbed. The second reaction is known as the Compton effect, which results in the liberation of an electron and the scattering of the incident gamma ray at a lower energy level. The third reaction is known as pair production, which can take place in three separate ways and produce signals of different energies. Thus, the various reactions which can take place in the detector contribute to the complexity of the spectra produced and the difficulty of identifying a specific element.

In accordance with the present invention, an improved well-logging device is provided which detects gamma rays that are generated in earth formations when the formations are bombarded by neutrons. The apparatus utilizes two gamma rays detectors which are positioned adjacent one another. One of the detectors is shielded from the earth formation, and the other is exposed to the gamma rays generated in the formation. In addition, collimation shields are provided between two detectors and between the exposed detector and the formation so that only gamma rays which emerge from the first detector at a predetermined angle with respect to the second detector are permitted to enter the second detector. This greatly reduces the interference which is normally present in a two-detector spectrometer. The outputs of the two detectors are applied to a coincidence circuit which operates a gate so as to permit detection of the gamma rays only when the two detectors are energized simultaneously.

Accordingly, it is an object of this invention to provide improved apparatus for identifying elements in earth formations.

Another object is to provide a method of increasing the sensitivity of nuclear well-logging devices.

Other objects, advantages and features of the invention should become apparent from the following detailed description which is taken in conjunction with the accompanying drawing in which:

FIG. 1 is a schematic view, shown partially in section, of an embodiment of the well-logging apparatus of this invention. FIG. 2 is a schematic circuit drawing of the electrical components associated with the apparatus in FIG. 1. FIG. 3 is a schematic representation of an operating feature of the apparatus of FIG. 1.

Referring now to the drawing in detail and to FIG. 1 in particular, there is shown a well-logging device 10 which is adapted to be lowered in a well 11 by means of a cable 12. Device 10 is provided with an outer housing 13 which encloses and protects the electrical components of the device and supports the detectors and shields. A neutron source 14 is mounted in one end of the housing. This neutron source can be any type of generator which is capable or irradiating the earth formation with neutrons. For example, this source can comprise a deutron accelerator with either a deuterium or tritium target. As an alternate, the source can be of the capsule type, such as a mixture of polonium and beryllium or a mixture of radium and beryllium. Source 14 can either be continuous or pulsed, in accordance with procedures well known in the art.

Two gamma ray detectors are disposed in housing 13 in spaced relationship with neutron source 14 so as to measure gamma rays which are generated in the formations from the neutron bombardment. These detectors can comprise two spaced scintillation crystals 15 and 16. Photomultiplier tubes 17 and 18 are positioned adjacent respective crystals 15 and 16 to measure flashes of light which are generated by gamma rays striking the crystals. A mass of gamma ray shielding material 20, such as lead, is disposed between source 14 and the detectors and also surrounds detector 15. A neutron shield can be associated with source 14 to block passage of neutrons from the source to the detectors. A shield 21 extends between detector 16 and housing 13, and is provided with a plurality of passages 22 which extend in parallel relationship with one another to collimate the incoming gamma rays. A shield 23 is disposed between detectors 15 and 16. This latter shield is provided with a plurality of parallel passages 24 which collimate radiation between detector 16 and detector 15. The operation of the collimating shields will be described in greater detail hereinafter.

The upper portion of device 10 houses the electrical components which are connected to tubes 17 and 18 and which are illustrated schematically in FIG. 2. The output signal from photomultiplier tube 17 is applied to the input of an amplifier 25, the output of which is applied to a first pulse height analyzer 26. The output from photomultiplier tube 18 is similarly transmitted through an amplifier 27 to a second pulse height analyzer 28. The outputs of pulse height analyzers 26 and 28 are applied to the inputs of a coincidence circuit 29. The output from pulse height analyzer 28 is also applied through a gate 30 to a third pulse height analyzer 31, the output of which is applied to a recorder 32. Gate 30 is controlled by the output of coincidence circuit 29 in a manner such that the gate is opened only when the coincidence circuit receives pulses simultaneously from analyzers 26 and 28. The circuit illustrated in FIG. 2 can be disposed within housing 13 or, as an alternate, a portion of the circuit can be positioned at the surface, such as shown in FIG. 1 where recorder 32 is positioned at the surface. Energy to actuate the electrical components of the logging apparatus is supplied by a power supply 33 which can be positioned at the surface.

As previously mentioned, there are several nuclear reactions which can take place when gamma rays strike the crystals of the scintillation detectors. When a gamma ray enters the field of a nucleus and disappears with the emission of an electron-positron pair, the process is referred to as "pair production." The threshold energy for this reaction is 1.02 Mev. Thus, the kinetic energy carried away by the electron-positron pair is the energy of the gamma ray photon minus this threshold energy. Since both the electron and position are ionizing particles, a flash of light will be created proportional to the energy of the gamma ray minus 1.02 Mev. The positron will be annihilated almost immediately by combining with an electron, resulting in the formation of two gamma rays, each with an energy of 0.51 Mev. Three separate possibilities can then occur; (1) both gamma rays can escape the crystal without further interaction, (2) one gamma ray can escape the crystal while the other undergoes a photoelectric reaction, and (3) both gamma rays can undergo photoelectric effects. Another reaction which can occur in the crystal is known as the Compton effect, in which the gamma ray enters an atom, knocks out a recoil electron, and scatters off with a reduced energy.

In a first method of operating the apparatus of this invention, pulse height analyzer 26 is set so as to transmit a signal only when a pulse is received by photomultiplier 17 which is representative of an energy level of 0.51 Mev. Pulse height analyzer 28 is set to transmit signals representative of this same energy level 0.51 Mev. or of substantially all energy levels. Pulse height analyzer 31 is a multiple cannel analyzer which is capable of detecting all signals from analyzer 28 which are passed through gate 30. The apparatus of FIG. 1 is constructed so as to detect selectively a particular gamma ray energy. For example, if the well-logging tool is to be employed to detect the presence of carbon, which is indicative of the presence of hydrocarbons in the formation, the apparatus can be constructed to detect selectively gamma rays having an energy of 4.43 Mev., a characteristic energy level of gamma rays emitted when carbon is bombarded by neutrons. With respect to Compton scattering, the energy of the scattered gamma ray, $E_s$, can be expressed by $$E_s = \frac{E}{1 + \frac{E}{0.51}(1 - \cos\theta)}$$

where $E$ is the energy of the original gamma ray and $\theta$ is the "Compton scattering angle." The angle $\theta$ is illustrated schematically in FIG. 3. This is the angle between the axes of passages 22 and 24 in respective shields 21 and 23. The geometry of the shields is such as to give the desired angle $\theta$ for any given measurement of gamma ray energy. The $E_s$ gamma ray that is absorbed in crystal 16 will thus be recorded as a one-escape peak because the pulse produced in crystal 15 will serve to trigger gate 30. By this procedure, a particular angle can be chosen to emphasize the one-escape peak of a given gamma ray of any other energy. This substantially increases the sensitivity of the logging tool to a particular energy of gamma ray. If gamma rays of 4.43 Mev. energy are to be detected, $\theta$ is selected to be approximately 83.5°.

In a second method of operation, the logging tool is constructed and operated so as to detect only the Compton coincidence component of a particular energy of gamma ray. For example, if the shield configuration is constructed so as to provide an angle $\theta$ of 10° and it is desired to detect a 4.43 Mev. gamma ray, $E_s$ is equal to 3.8 Mev. In this mode of operation, pulse height analyzer 26 is set to transmit energy representative of 3.8 Mev. and pulse height analyzer 28 is set to transmit energy which is equal to 4.43 minus 3.8 or 0.63 Mev. As an alternative, pulse height analyzer 28 can be set to transmit all energy levels.

In order to eliminate thermal neutrons which may migrate into the logging tool from the surrounding formations and any well fluids, a shield 35 is disposed around the detecting elements. This shield can advantageously be constructed of lithium fluoride to remove thermal neutrons. Metallic housing 13 serves to attenuate low energy gamma rays which may tend to enter crystal 16 through passages 22. If desired, additional shielding can be employed in this region to reduce still further the low energy gamma rays.

In place of the scintillation crystals previously described, lithium-drifted germanium detectors can be employed. These detectors have considerably more sensitivity, but must be operated at quite low temperatures and under vacuum conditions.

While this invention has been described in conjunction with presently preferred embodiments, it should be evident that it is not limited thereto. I claim:

1. Well-logging apparatus comprising:
a housing adapted to be lowered into a well;
a neutron source carried by said housing to radiate neutrons;
first and second gamma ray detectors carried by said housing at respective first and second locations which are in spaced relationship with one another and with said neutron source;
first shielding means of material and configuration so as to enclose said first and second detectors and to block direct passage of gamma rays from regions exterior of said housing except those gamma rays which move from such regions to said first detector at a first preselected angle with respect to the axis of said housing, said first shielding means blocking direct passage of gamma rays from said exterior regions to said second detector; and
second shielding means positioned between said first and second detectors, said second shielding means being of such material and configuration so as to block passage of gamma rays from said first detector to said second detector except those gamma rays which move from said first detector to said second detector at a second preselected angle with respect to said first angle.

2. The apparatus of claim 1 wherein said first gamma ray detector comprises a first scintillation crystal positioned at said first location, and a first photomultiplier tube positioned adjacent said first crystal to receive light flashes therefrom; and said second gamma ray detector comprises a second scintillation crystal positioned at said second location, and a second photomultiplier tube positioned adjacent said first crystal to receive light flashes therfrom, said tubes being positioned with respect to said crystals so that said first tube receives light flashes only from said first crystal and said second tube receives light flashes only from said second crystal.

3. The apparatus of claim 2 wherein said shielding means are constructed of lead.

4. The apparatus of claim 2 wherein said first shielding means is provided with a plurality of first straight passages which extend outwardly from said first crystal at said first angle, and said second shielding means is provided with a plurality of second straight passages which are parallel with one another and which extend from said first crystal to said second crystal at said second angle, said passages permitting passage of gamma rays therethrough.

5. The apparatus of claim 4 wherein the angle between said first and second passages is approximately 83.5°.

6. The apparatus of claim 2, further comprising a thermal neutron shield enclosing said first and second detectors.

7. The apparatus of claim 2 further comprising:
first, second and third pulse height analyzers;
a coincidence circuit;
a gate circuit;
a recorder;
means connecting the outputs of said first and second photomultiplier tubes to the inputs of said first and second analyzers, respectively;
means connecting the outputs of said first and second analyzers to the inputs of said coincidence circuit;
means connecting the output of said first analyzer to the input of said gate circuit;
means to control opening of said gate circuit in response to the output of said coincidence circuit;
means connecting the output of said gate circuit to the input of said third pulse height analyzer; and
means connecting the output of said third pulse height analyzer to said recorder.

8. The apparatus of claim 7 wherein said second pulse height analyzer is set to pass only signals representative of detected gamma rays having energies of approximately 0.51 Mev.